Patented June 17, 1947

2,422,435

UNITED STATES PATENT OFFICE 2,422,435

MANUFACTURE OF CYCLOHEXENE OXIDES

Herman Pines and Vladimir N. Ipatieff, Riverside, and Ralph C. Olberg, Evanston, Ill., assignors to Universal Oil Products Company, Chicago, Ill., a corporation of Delaware No Drawing. Application December 10, 1942, Serial No. 468,560

11 Claims. (Cl. 260—348)

The present invention relates particularly to the manufacture of oxides of the cyclohexene oxide type and is more specifically concerned with a process whereby these compounds are made by the dehydration of the corresponding cycloalkanediols.

In one specific embodiment the present invention comprises a process for the manufacture of 1,4-cyclohexene oxide which comprises contacting cyclohexanediol-1,4 with a catalytic material having regulated dehydrating properties.

The compound serving as the base material in the present process may be made from quinone or hydroquinone by hydrogenation in the presence of catalysts. It can also be made by the reduction of 1,4-cyclohexanedione. The cis-isomer has a melting point of 102° C. and the trans-isomer, which is preferably used in the present process, has a melting point of 139° C. The isomers may be readily separated by preparing their diacetates and fractionally crystallizing the isomers from an acetone solution after which the corresponding cyclohexanediols are recovered by saponifying the acetates.

In accordance with the present invention the diols are dissolved in a suitable solvent such as, for example, methanol, higher molecular weight saturated alcohols, acetone, etc., and the solution is contacted with a material having dehydrating activity. Such materials include various forms of activated aluminas produced by heating hydrated aluminas such as precipitated hydrated aluminas or naturally occurring hydrated minerals at temperatures within the approximate range of 500 to 700° C. Alternatively, other oxides having dehydrating properties such as, for example, thorium oxide or any known dehydrating catalysts may be used, provided the experimental conditions are so adjusted that the oxide formed is not attacked by the catalyst.

The conversion process is conducted by dissolving about one mol of a cyclohexanediol-1,4 in about 3 mols of a solvent such as methanol, and passing the solution through a reactor containing granular dehydrating oxide at a temperature of from about 150 to about 400° C., and a liquid hourly space velocity of from about 0.25 to about 1. As will be shown in a later example the dehydrating activity of an agent used for this purpose requires regulation if good yields of the desired cyclohexene oxide are to be obtained. The process is conducted under such pressure as may be developed when such solutions are employed at some temperature within the range given. For small scale operations the process may be conducted under batch conditions wherein the diol is added to a vessel containing the dehydrating catalyst, and the vessel is then heated for a time adequate to effect the necessary degree of dehydration.

Reactions which may take place when a 1,4-cyclohexanediol is dehydrated are typified by the following equations in which the compounds are indicated structurally:

(1)

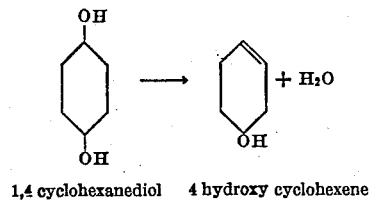

1,4 cyclohexanediol    4 hydroxy cyclohexene (2)

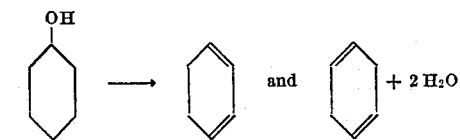

1,3 cyclohexadiene    1,4 cyclohexadiene (3)

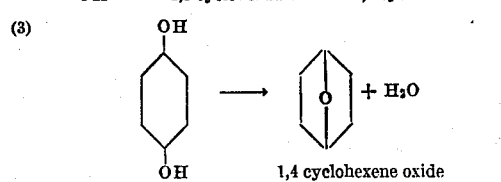

1,4 cyclohexene oxide

The first two reactions occur when more or less drastic conditions are employed in the dehydration process, while a reaction according to the third equation occurs when the conditions are moderated as in the present process by either employing solvents or less intensive conditions of operation in respect to temperature and dehydrating activity of the agents used for this purpose.

After a run has been made, the desired cyclohexene oxide is separated from unreacted charge and byproducts by fractional distillation and the unreacted materials may be further processed to increase the ultimate yield of the cyclohexene oxide.

1,4-cyclohexene oxide is a compound not previously reported in scientific or other publications. It is a liquid which boils at 120° C., has a density of 0.9477 at 20° C. referred to water at 4° C., and has a refractive index at 20° C. of 1.4480 for the D line of sodium. The compound has the structural formula shown on the right hand side of Equation 3 above, but the oxygen atom which bridges between the number 1 and number 4 carbon atoms in the cyclohexene ring is not in the same plane as the six carbon atoms. The material is utilizable in the production of miscellaneous derivatives, as a solvent and as a constituent of motor fuel.

The process of the present invention is applicable to the treatment of not only cyclohexanediols such as the 1,3- or the 1,4-compounds specifically mentioned but also to the treatment of alkyl or other group substituted cyclohexanediols and of polynuclear diols of the type decahydronaphthalenediols such as the 1,3- or the 1,4-compound. Of the cyclohexanediols the 1,4-trans compound gives higher yields of the corresponding 1,4-cyclohexene oxide. For example, in the case of 1,4-compound a yield of about 75 per cent of the theoretical amount of 1,4-cyclohexene oxide is obtainable while under approximately similar operating conditions the cis isomer yields about 25 per cent of the corresponding oxide and more of the cyclohexenol.

The following data are introduced to illustrate the conditions of operation and results obtainable in the manufacture of 1,4-cyclohexene oxide according to the present process but the data are not introduced with the intent of unduly limiting the proper scope of the invention. The process, for example, may be used for the production of a 1,3-cyclohexene oxide from the corresponding 1,3-cyclohexanediol.

*Example I*

32 parts by weight of 1,4-cyclohexanediol and 25 parts by weight of alumina were added to a reaction vessel which was heated at 240° C. During the heating, products boiling within the range of 88° to 140° C. were distilled and condensed. The upper layer of organic material was separated from a water layer and dried and distilled to recover 1,4-cyclohexene oxide which was recovered in an amount equal to 46 weight per cent based on the original charge.

*Example II*

One mol of cyclohexanediol-1,4 was dissolved in 3 mols of methanol and the solution passed over granular activated alumina at the temperatures and rates indicated in Table I. The products were fractionated to separate unreacted materials from the desired reaction product and the incidental byproducts indicated. The solution was passed over granular activated aluminas occupying 120 cc. space in the reaction tube.

Table I

| Run Number | 1 | 2 | 3 | 4 | 5 | 6 |
|---|---|---|---|---|---|---|
| Conditions: | | | | | | |
| Temperature, °C | 300 | 300 | 332 | 365 | 361 | 400 |
| Rate, Cc./Hour | 44 | 127 | 127 | 127 | 127 | 122 |
| Hourly Liquid Space Velocity | 0.35 | 1.05 | 1.05 | 1.05 | 1.05 | 1.00 |
| Duration of Run, Hours | 2.5 | 3 | 1.5 | 1 | 1.5 | 1 |
| Weight Balance: | | | | | | |
| Total Liquid Charged | | 348.7 | 134.4 | 119.4 | 181.4 | 114 |
| Total Liquid Recovered | | 340.8 | 123.8 | 115.4 | 153.5 | 93.6 |
| Main Products Obtained, Mol Per Cent: | | | | | | |
| Cyclohexadiene | 6 | 3.8 | 10 | 7 | 55 | 70 |
| 1,4-Cyclohexene Oxide | 30 | 46.0 | 35 | 15 | None | None |
| Cyclohexenol | 4 | 13.5 | 6 | 8 | 5 | 5 |
| Higher Boiling Products | 20 | 19 | 7 | 12 | 25 | 25 |

The alumina used in runs 1 to 4 was a mildly dehydrating material which was prepared from aluminas calcined at temperatures of the order of 500° C. The aluminas used in runs 5 and 6 were in the form of pills which had been made up from powdered aluminas and calcined at 550° C., which rendered them more strongly dehydrating. The results of these two runs which gave high yields of cyclohexadiene and none of the desired cyclohexene oxide indicate that the dehydrating effect was too pronounced when both higher temperatures and more highly dehydrating oxides were employed. This indicates the sensitivity of the present type of reaction.

We claim as our invention:

1. A process for the production of cycloalkene oxides which comprises dehydrating a cycloalkanediol by the action of a metal oxide dehydrating catalyst at a temperature of from about 150° C. to about 400° C., correlating the reaction temperature and time with the catalyst activity to effect dehydration of a substantial portion of said cycloalkanediol to the corresponding cycloalkene oxide, and separating said cycloalkene oxide from the resultant dehydration products.

2. A process for the production of cyclohexene oxides which comprises dehydrating a cyclohexanediol by the action of a metal oxide dehydrating catalyst at a temperature of from about 150° C. to about 400° C., correlating the reaction temperature and time with the catalyst activity to effect dehydration of a substantial portion of said cyclohexanediol to the corresponding cyclohexene oxide, and separating said cyclohexene oxide from the resultant dehydration products.

3. The process of claim 2 further characterized in that the cyclohexanediol is dissolved in an aliphatic alcohol.

4. The process of claim 2 further characterized in that said catalyst comprises Activated Alumina.

5. The process of claim 2 further characterized in that said catalyst comprises thoria.

6. A process for the production of polycyclohexene oxides which comprises dehydrating a polycyclohexanediol by the action of a metal oxide dehydrating catalyst at a temperature of from about 150° C. to about 400° C., correlating the reaction temperature and time with the catalyst activity to effect dehydration of a substantial portion of said polycyclohexanediol to the corresponding polycyclohexene oxide, and separating said polycyclohexene oxide from the resultant dehydration products.

7. A process for the production of 1,4 cyclohexene oxide which comprises contacting a solution of 1,4 cyclohexanediol in a suitable solvent with a metal oxide dehydrating catalyst at a temperature of from about 150° C. to about 400° C., at a liquid hourly space velocity of from about 0.25 to about 1, and at a pressure substantially equivalent to the vapor pressure of the solution under the temperature employed, correlating the temperature and space velocity with the catalyst activity to effect dehydration of a substantial portion of the 1,4 cyclohexanediol to 1,4 cyclohexene oxide, and separating said 1,4 cyclohexene oxide from the resultant dehydration products.

8. The process of claim 7 further characterized in that said solvent comprises methanol.

9. The process of claim 7 further characterized in that said catalyst comprises Activated Alumina.

10. The process of claim 7 further characterized in that said catalyst comprises thoria.

11. The process of claim 7 further characterized in that said 1,4 cyclohexanediol comprises trans-1,4 cyclohexanediol.

HERMAN PINES.
VLADIMIR N. IPATIEFF.
RALPH C. OLBERG.

REFERENCES CITED

The following references are of record in the file of this patent:

UNITED STATES PATENTS

| Number | Name | Date |
| --- | --- | --- |
| 2,116,439 | Levine | May 3, 1938 |
| 1,757,468 | Muller | May 6, 1930 |

OTHER REFERENCES

Beilstein, Organische Chemie, vierte Auflage, vol. XVII, page 22; vol. VI (Erstes Ergansungswerk), page 370, citing: Berichte, vol. 43, page 3384.

Chemical Abstracts, vol. 19, page 1857 (1925), citing: Compt. rend., vol. 180, pages 790-3 (1925).